(12) United States Patent
Williams

(10) Patent No.: US 10,430,038 B2
(45) Date of Patent: Oct. 1, 2019

(54) AUTOMATED DATA OVERLAY IN INDUSTRIAL MONITORING SYSTEMS

(71) Applicant: General Electric Company, Schenectady, NY (US)

(72) Inventor: Scott Terrell Williams, Minden, NV (US)

(73) Assignee: General Electric Company, Schenectady, NY (US)

( * ) Notice: Subject to any disclaimer, the term of this patent is extended or adjusted under 35 U.S.C. 154(b) by 965 days.

(21) Appl. No.: 14/335,816

(22) Filed: Jul. 18, 2014

(65) Prior Publication Data

US 2016/0018961 A1   Jan. 21, 2016

(51) Int. Cl.
  *G06F 3/0484* (2013.01)
  *G05B 23/02* (2006.01)
  *G06T 11/20* (2006.01)
  *G01H 1/00* (2006.01)

(52) U.S. Cl.
  CPC ......... *G06F 3/0484* (2013.01); *G05B 23/024* (2013.01); *G05B 23/0237* (2013.01); *G05B 23/0278* (2013.01); *G06T 11/206* (2013.01); *G01H 1/006* (2013.01); *G06T 2200/24* (2013.01)

(58) Field of Classification Search
  CPC . G06F 3/0484; G06T 11/206; G06T 2200/24; G05B 23/0278; G05B 23/0237; G05B 23/024; G05B 23/0272; G01H 1/006
  See application file for complete search history.

(56) References Cited

U.S. PATENT DOCUMENTS

| | | | |
|---|---|---|---|
| 7,966,150 B2 | 6/2011 | Smith et al. | |
| 7,987,725 B2 | 8/2011 | Twerdochlib | |
| 2005/0187946 A1 | 8/2005 | Zhang et al. | |
| 2006/0126932 A1 | 6/2006 | Eschbach | |
| 2007/0109301 A1 | 5/2007 | Smith | |
| 2008/0120335 A1 | 5/2008 | Dolgoff | |
| 2009/0037206 A1* | 2/2009 | Byrne | G06Q 10/06 705/305 |
| 2009/0040238 A1 | 2/2009 | Ito et al. | |

(Continued)

FOREIGN PATENT DOCUMENTS

EP   1111550 A1   6/2001

OTHER PUBLICATIONS

European Search Report and Written Opinion issued in connection with corresponding EP Application No. 15175513.9-1802 dated Dec. 16, 2015.

*Primary Examiner* — Nicholas Ulrich
(74) *Attorney, Agent, or Firm* — Mintz Levin Cohn Ferris Glovsky and Popeo, P.C.

(57) ABSTRACT

Systems and methods include receiving an indication of a selection of a first piece of equipment in an industrial monitoring system. The systems and methods also include determining a first feature of interest in a plot corresponding to a first sensor. Additionally, the systems and methods include matching the first feature of interest with corresponding second features of interest in a second plot. Furthermore, the systems and methods include overlaying the first plot with the second plot based at least in part on the first feature of interest and the corresponding second feature of interest.

23 Claims, 5 Drawing Sheets

(56) References Cited

U.S. PATENT DOCUMENTS

| | | |
|---|---|---|
| 2009/0076634 A1* | 3/2009 | Takahara ............ G05B 23/0235 |
| | | 700/80 |
| 2009/0147026 A1 | 6/2009 | Buck et al. |
| 2010/0023307 A1 | 1/2010 | Lee et al. |
| 2010/0030493 A1 | 2/2010 | Rao |
| 2011/0049883 A1 | 3/2011 | Hatch et al. |
| 2011/0276842 A1* | 11/2011 | Shibamori ......... G05B 23/0264 |
| | | 714/49 |
| 2011/0277535 A1 | 11/2011 | Twerdochlib |
| 2012/0204875 A1* | 8/2012 | Brazy ............... A61M 16/0051 |
| | | 128/204.22 |
| 2012/0272186 A1* | 10/2012 | Kraut .................... G06F 3/0488 |
| | | 715/810 |
| 2012/0303703 A1 | 11/2012 | Richter et al. |
| 2012/0316782 A1 | 12/2012 | Sartipi et al. |
| 2013/0069792 A1* | 3/2013 | Blevins ................. G05B 17/02 |
| | | 340/815.4 |
| 2013/0118183 A1 | 5/2013 | Wang et al. |
| 2014/0137024 A1* | 5/2014 | Curtis ................... G06F 3/0481 |
| | | 715/771 |
| 2014/0160152 A1 | 6/2014 | Williams et al. |
| 2014/0168247 A1 | 6/2014 | Williams et al. |

\* cited by examiner

AUTOMATED DATA OVERLAY IN INDUSTRIAL MONITORING SYSTEMS

BACKGROUND

The subject matter disclosed herein relates to systems and methods for grouping content presented on a graphical user interface (GUI) of a condition monitoring system. More specifically, the subject matter disclosed herein relates to overlaying data from multiple plots.

Industrial monitoring systems, such as asset condition monitoring systems, generally provide monitoring capabilities for various types of mechanical devices and systems. For example, an industrial monitor may monitor one or more operational parameters of a gas turbine system. Here, the industrial monitoring system may include a number of sensors (e.g., temperature sensors, pressure sensors, flow sensors, and so forth) disposed throughout the gas turbine system. Such sensors may provide the industrial monitoring system data related to parameters associated with the gas turbine system.

In this manner, condition monitoring systems may provide users with valuable information regarding the health or condition of various machines in an industrial environment. For instance, condition monitoring systems may receive inputs from a broad range of sources in a plant including permanent and portable condition monitoring hardware/software, process control and automation hardware/software, process historians, maintenance management and reliability software, spreadsheets, operator logs, and the like. Using the data received from these sources, users of the condition monitoring systems may analyze the data with various tools provided by the condition monitoring systems. However, due to a decreasing availability of technically inclined personnel in the general workforce of the industrial industry, it is now recognized that improved systems and methods for operating condition monitoring systems via a graphical user interface are desired.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a system includes a processor configured to receive an indication of a selection of a first piece of equipment in an industrial system. The processor is also configured to determine a first feature of interest in a first plot corresponding to a first sensor. Additionally, the processor is configured to match the first feature of interest with a corresponding second feature of interest in a second plot. Furthermore, the processor is configured to overlay the first plot with the second plot based at least in part on the first feature of interest and the corresponding second feature of interest.

In a second embodiment, a method includes determining a first feature of interest in a first plot of data undergoing diagnosis, wherein the first plot is obtained from one or more sensors in an industrial system. The method also includes automatically matching, via a processor, the first feature of interest with a corresponding second feature of interest in a second plot. The method further includes automatically overlaying, via the processor, the first plot with the second plot based at least in part on the first feature of interest and the corresponding second feature of interest.

In a third embodiment, a non-transitory, computer-readable medium having stored thereon instructions that, when executed, are configured to cause a processor to determine a first feature of interest in a first plot of data undergoing diagnosis. The first plot is obtained from one or more sensors in an industrial system. The processor is also configured to automatically match the first feature of interest with a corresponding second feature of interest in a second plot. Furthermore, the processor is configured to overlay the first plot with the second plot based at least in part on the first feature of interest and the corresponding second feature of interest.

BRIEF DESCRIPTION OF THE DRAWINGS

These and other features, dimensions, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Present embodiments relate to methods and systems of automating cross equipment data overlays in graphical user interfaces (GUIs), such as in data visually represented in condition monitoring systems. In some embodiments, the condition monitoring system may include multiple graphical plots corresponding to various data, such as a graphical plot for each of multiple pieces of equipment at the same time, a single piece of equipment at multiple time periods, or some combination thereof. In particular, data for a piece of equipment or time period being diagnosed may be compared to data for other equipment or from other time periods. A closest matching trend may be visually overlaid with the data for the diagnosed equipment or time period to enable a user to quickly identify similar trends in the past (i.e., a single screen view with overlapping and/or overlaid visual representations of data). In some embodiments, the comparison data may have information tags that indicate that some error occurred related (e.g., before, during, or after) to the measurement of interest. For example, a particular spike shape in a vibration sensor may indicate an imbalance in a motor that causes excess vibration that should be addressed immediately, or other maintenance situations such as low oil pressure or lubrication needed. In certain embodiments, the plots may be used to identify various problems with the monitored system, such as a failure, an impending failure, a performance degradation, a leak, a rub condition (e.g., between rotating and stationary parts), a crack, a friction condition (e.g., lubrication needed), another problem that may occur in an industrial environment, or some combination thereof.

Figure 1:
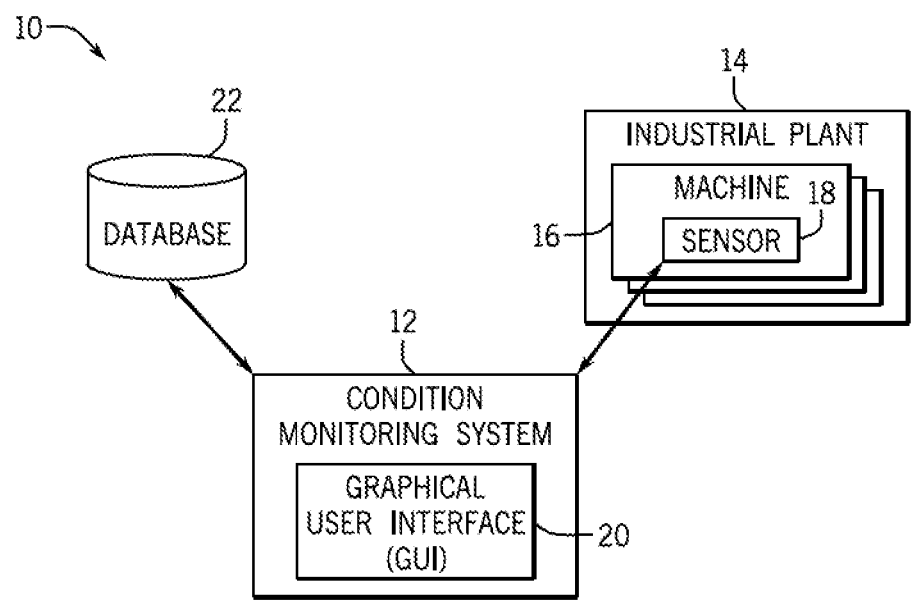
FIG. 1 illustrates a block diagram of an industrial monitoring system, in accordance with embodiments presented herein.

With the foregoing mind, it may be useful to describe an embodiment that may be used to display multiple plots. By way of introduction, FIG. 1 illustrates a block diagram of an industrial monitoring system 10 in which various types of machines used for industrial processes may be monitored. The industrial monitoring system 10 may include a condition monitoring system 12, which may receive data from various components (e.g., machines) that may be part of an industrial environment. For example, the condition monitoring system may monitor components used in a plant 14. The plant 14 may include any type of industrial environment where different components or machines may be used to complete one or more industrial processes. As such, the plant 14 may correspond to an oil refinery, a manufacturing facility, a turbomachine system, a power generation system, a gasification system, a chemical production system, a gas turbine system, a steam turbine system, a combined cycle system, a power plant, or the like.

The components in the plant 14 may include one or more machines 16, such as a gasifier, a gas treatment unit, an electric motor, a combustion engine, a gas turbine, a heat exchanger, centrifugal pumps, centrifugal compressors, fans, reciprocating compressors, generators, steam turbines, wind turbines, piping, axial compressors, screw compressors, gears, turbo-expanders, blowers, agitators, mixers, pulp refiners, ball mills, crushers, pulverizers, extruders, pelletizers, cooling towers, boilers, furnaces, heat recovery steam generators (HRSGs), and the like. Each machine 16 may include one or more sensors 18 that may monitor various conditions of a respective machine 16. The sensors 18 may include temperature sensors, current sensors, voltage sensors, pressure sensors, displacement sensors, vibration sensors, velocity sensors, acceleration sensors, flow sensors, clearance sensors, flame sensors, gas composition sensors, speed sensors, emissions sensors, torque sensors and any other type of sensor that may provide information with respect to the operation of the respective machine 16.

Generally, the data acquired by the sensors 18 may be received by the condition monitoring system 12 via a direct link (i.e., hardwired), a network link, or a portable memory device (e.g., Universal Serial Bus memory drive). In one embodiment, the condition monitoring system 12 may include a graphical user interface (GUI) 20 that may generate visualizations that represent the machines 16 and the sensors 18 being monitored by the condition monitoring system 12. As such, users of the condition monitoring system 12 may monitor the health or status of machines 16 in the plant 14 via the dynamic GUI 20. Further, the condition monitoring system 12 may be used to measure one or more mechanical devices of larger mechanical systems (e.g., steam turbine systems, hydraulic turbine systems, wind turbine systems, reactors, gasifiers, gas treatment systems, industrial automation systems, hyper reciprocating compressors, or other suitable mechanical systems).

The GUI 20 may enable the user to perform various types of data processing or analysis using tools provided by the condition monitoring system 12 or by separate data processing or analysis products. For instance, the user may generate a graph plotting a statistical trend of the data received from a particular sensor 18 over time. In one embodiment, after the statistical trend graph has been generated, the user may dynamically control the data being analyzed by the tool by selecting a different sensor 18 visualization displayed in the GUI 20.

In addition to data acquired by the sensors 18, the condition monitoring system 12 may receive data from a database 22 which may be stored within the condition monitoring system 12, in a server, in a cloud-computing device, or the like. The database 22 may include historical data related to the data acquired by the sensors 18, calculated data associated with a machine 16 or sensor 18, results from previous data processing or analysis functions performed on data associated with a machine 16 or sensor 18, or other contextual data related to the plant 14. For example, the database 22 may include data related to the historical operating conditions (e.g., when operating at full capacity) of the plant 14 such as a plant historian or the like.

Although FIG. 1 has been described with respect to an industrial environment, it should be noted that the systems and techniques described herein may be applied to other systems outside of the industrial environment. As such, the systems and techniques described herein should not be limited to industrial environments and the like.

Figure 2:
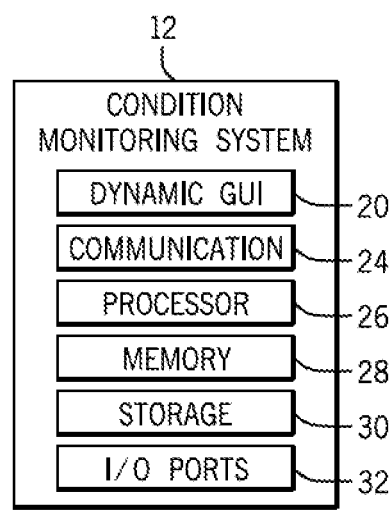
FIG. 2 illustrates a block diagram of a condition monitoring system that may be employed in the industrial monitoring system of FIG. 1, in accordance with embodiments presented herein.

In addition to the GUI 20, the condition monitoring system 12 may include various other components to display data, processing or analysis of data, and the like via the GUI 20. FIG. 2 illustrates a block diagram of some example components that may be part of the condition monitoring system 12. As shown in the figure, the condition monitoring system 12 may include a GUI 20, a communication component 24, a processor 26, a memory 28, a storage 30, input/output (I/O) ports 32, and the like. The communication component 24 may be a wireless or wired communication component that may facilitate communication between the condition monitoring system 12, the machines 16, the sensors 18, the database 22, other control or monitoring systems, and the like. The processor 26 may be any type of computer processor or microprocessor capable of executing computer-executable code. The memory 28 and the storage 30 may be any suitable articles of manufacture that can serve as media to store processor-executable code, data, or the like. These articles of manufacture may represent non-transitory computer-readable media (i.e., any suitable form of memory or storage) that may store the processor-executable code used by the processor 26 to, among other things, analyze data and dynamically link analyzed data with visualizations displayed and selected via the GUI 20. Non-transitory computer-readable media merely indicates that the media relates to tangible media and not transitory signals.

The GUI 20 may include any type of display device including a touch screen display device that may receive user inputs via the display device itself. In certain embodiments, the GUI 20 may interact with the communication component 24, the processor 26, the memory 28, the storage 30, and the input/output (I/O) ports 32 to dynamically update or control visualizations displayed on the GUI 20. The GUI 20 may be disposed on any type of computing device including an industrial monitor, a workstation, a portable monitoring device, a smart phone device, or another suitable device.

The sensors and transmitters may be used to monitor various physical, environmental, and operational parameters related to the operation and performance of the monitored system. In certain embodiments, the parameters may include ambient temperature, ambient pressure, humidity, air quality, exhaust gas temperature, rotor speed, engine temperature, engine pressure, fuel temperature, engine fuel flow, exhaust flow, vibration, clearance between rotating and stationary components, compressor discharge pressure, or other suitable parameters. Information relating to the parameters may be tracked and displayed in the GUI 20 using multiple plots.

In certain embodiments, an operator monitoring a system may wish to observe a view of one or more of the plots corresponding to a sensor in relation to previously captured data or data captured from similar devices. The presently disclosed embodiments may overlay one or more plots related to the sensors in a common screen view. For example, the operator may overlay plots related to a class of the sensors or devices, such as sensors related to various devices of a single type (e.g., feedwater pumps).

Figure 3:
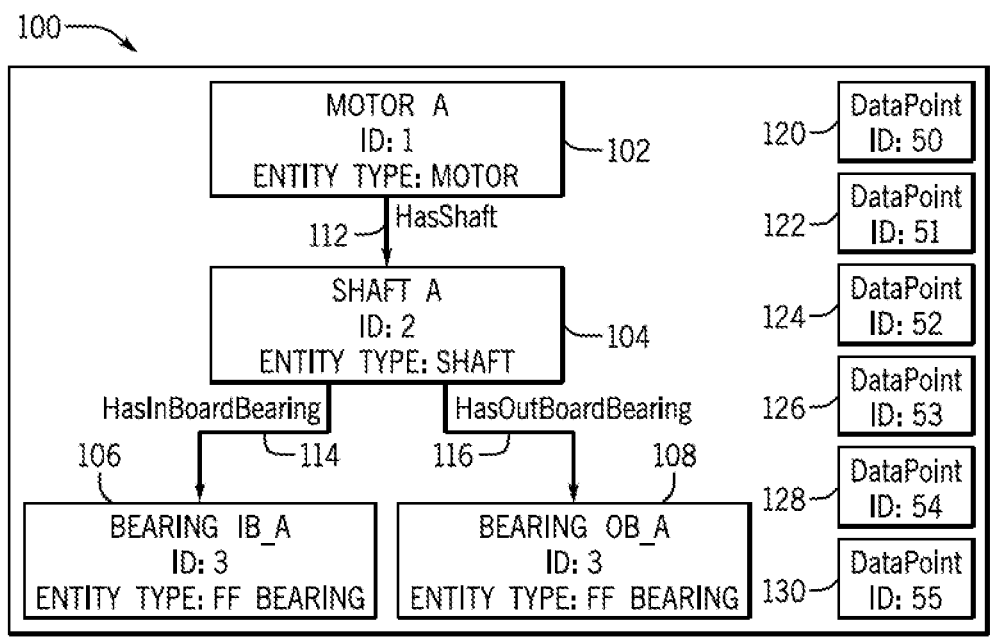
FIG. 3 illustrates a block diagram view of a model of a monitored component monitored using the interface of FIG. 1, in accordance with present embodiments.

Furthermore, information about entities being monitored may be stored in the memory 28, another memory device, or a combination thereof. Entities, as described herein, correspond to building blocks to model monitored components. For example, FIG. 3 includes a model 100 of a monitored component (e.g., feedwater pump) having a motor 102, a shaft 104, an inboard bearing 106, and an outboard bearing 108 (collectively referred to as entities 102-108). Relationships between the entities 102-108 may correspond to various details about the entities. For example, HasShaft reference 112 indicates that the motor 102 has a shaft 104, HasInBoardBearing reference 114 indicates that the shaft 104 has an inboard bearing 106, and HasOutBoardBearing reference 116 indicates that the shaft 104 has an outboard bearing 108. The references are used to connect the modeled components and give meaning to the relationships among the entities 102-108.

Further, each model has properties that define information about the model. For example, an ID property may be used to provide a unique identifier to distinguish among the entities in the system. For example, six data points 120, 122, 124, 126, 128, and 130 (collectively referred to as data points 120-130) may be defined in the system. Data points 120-130 may provide data from sensors or other data sources including manually entered data that is made available for processing via processor 26, other processors, or a combination thereof (collectively referred to as "the processors") to produce data plots. In some embodiments, the data points 120-130 may be stored in memory 28, another memory device, or a combination thereof for later access or processing.

Figure 4:
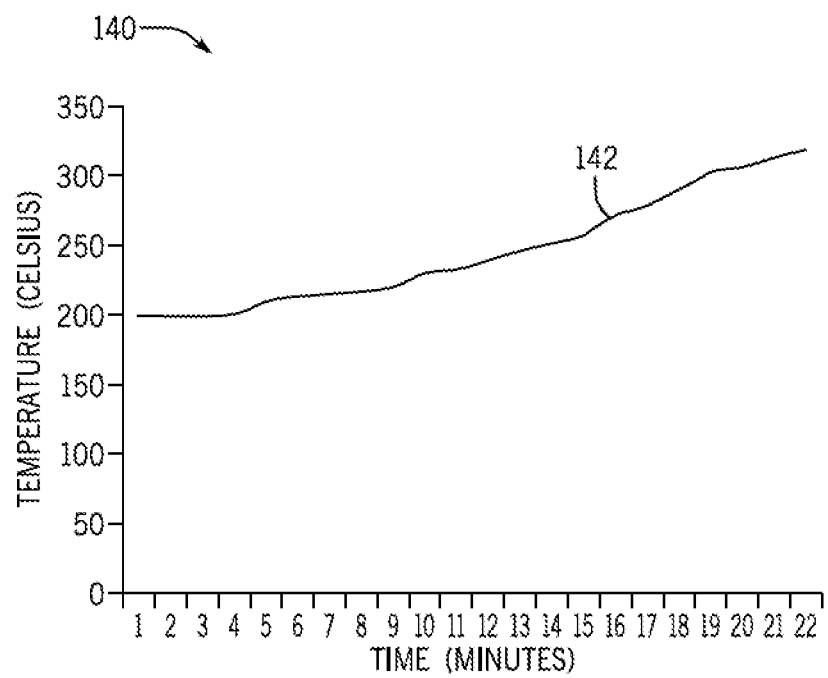
FIG. 4 illustrates a graphical plot to be diagnosed, in accordance with present embodiments.

For example, data point 120 may include information related to temperature measurements from the sensor 18 that measures temperature. FIG. 4 illustrates screen view of a graphical plot 140 that includes information derived from the sensor 18 that measures temperature for processing according to an embodiment. The plot 140 includes a trend 142 that corresponds to a temperature increase over time. In some embodiments, the temperature increase may represent a malfunction of a monitored device (e.g., feedwater pump). This trend 142 may be stored in memory 28, another memory device, or a combination thereof for later access or processing to compare to other trends.

Figure 5:
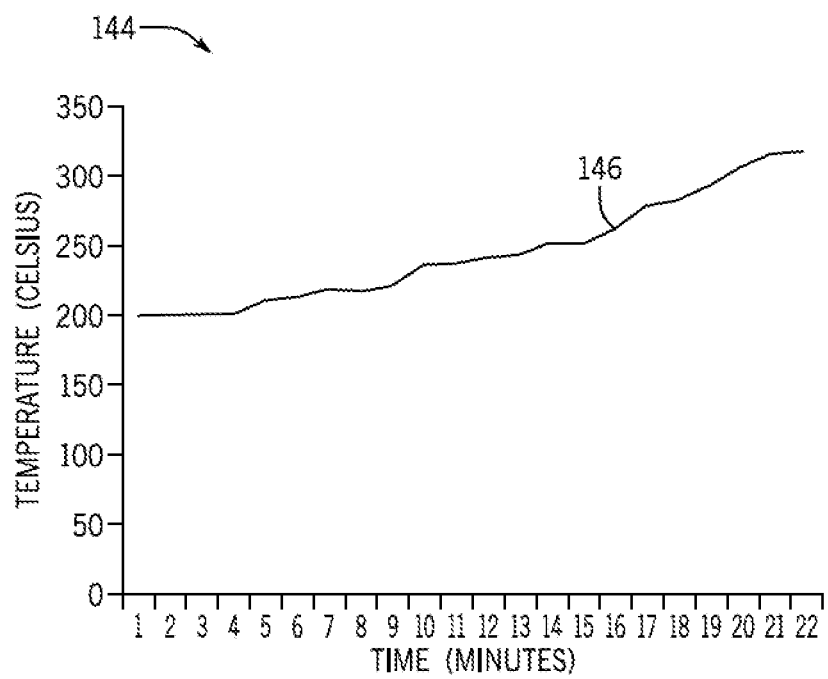
FIG. 5 illustrates a screen view of a graphical plot to be matched to the graphical plot of FIG. 4, in accordance with present embodiments.
Figure 6:
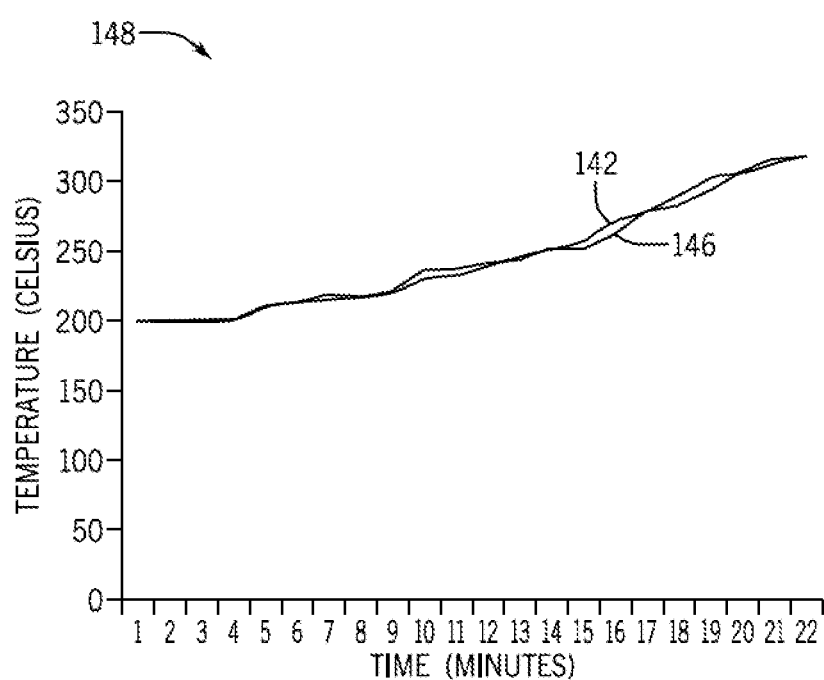
FIG. 6 illustrates a screen view of an overlay of the graphical plots of FIGS. 4 and 5, in accordance with present embodiments.

FIG. 5 illustrates a screen view of a graphical plot 144 that includes additional information. For example, the plot 144 may include a trend 146 that corresponds to a temperature increase over time measured by the same temperature sensor but derived at a different time than the plot 140. Additionally or alternatively, the plot 144 may correspond to a different temperature sensor derived at the same time or at a time different than the plot 142. The processors may be used to graphically overlay the trends 142 and 146 in a graphical plot 148 (FIG. 6) for display via the GUI 20. In some embodiments, the entire plots 142 and 144 may be overlaid when displayed. In some embodiments, the graphical plots may be scaled—in any dimension—to aid in aligning trends within the various related graphical plots.

Figure 7:
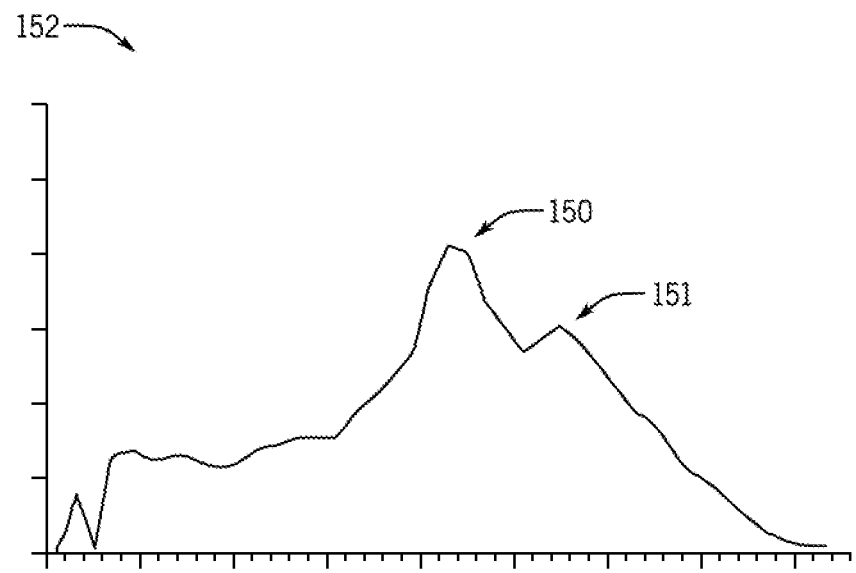
FIG. 7 illustrates a screen view of a graphical plot having two features of interest, in accordance with present embodiments.
Figure 8:
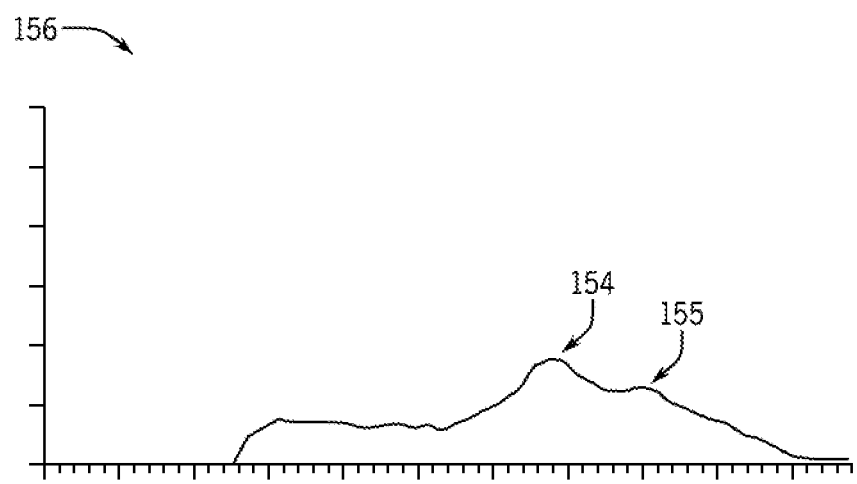
FIG. 8 illustrates a screen view of a graphical plot to be matched with the graphical plot of FIG. 7, in accordance with present embodiments.
Figure 9:
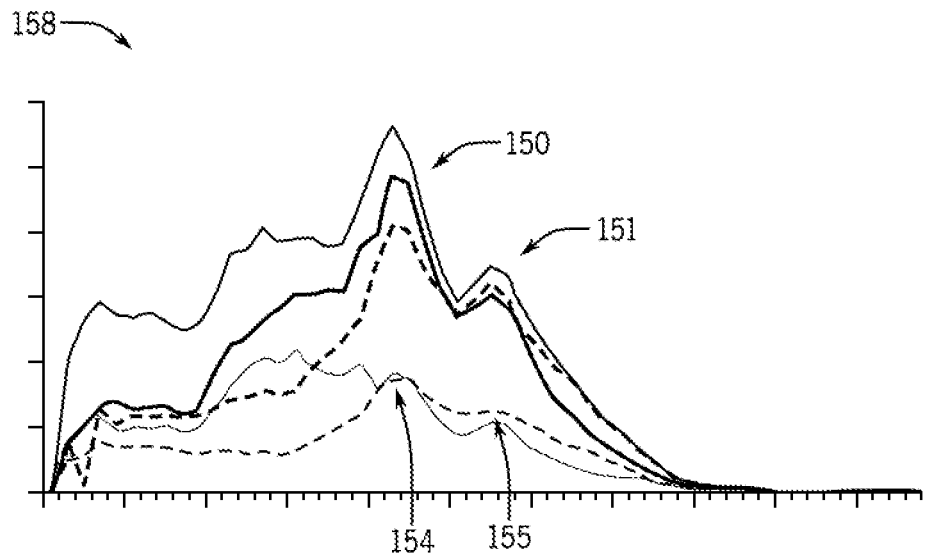
FIG. 9 illustrates a screen view of an overlay of the graphical plots of FIGS. 7 and 8 with additional graphical plots, in accordance with present embodiments.

In certain embodiments, the processors may search for one or more features of interest within a plot that may match an arrangement of one or more other features of interest in other plots and attempt to overlay the plots according to the features of interest. In some embodiments, the features of interest may include peak values, values surpassing a threshold, plot shapes, sharp slope changes, or other data trends that may be identifiable within one or more plots and used to identify the one or more plots. For example, the processors may identify features of interest 150 and 151 as the peak values of plot 152 as illustrated in FIG. 7 and match the features of interest 150 and 151 to features of interest 154 and 155 as the peak value of plot 156 as illustrated in FIG. 8. In some embodiments, the plots 152 and 156 may be expressed in similar time units, but the features of interest 154 and 155 may occur later than the features of interest 150 and 151. However, in certain embodiments, the processors align the features of interest 150 and 151 with 154 and 155, respectively. The resulting overlay plot 158 (FIG. 9) is presented via a display for analysis by the operator. Furthermore, in some embodiments, such as the illustrated embodiment, multiple trends may be overlaid concurrently. In certain embodiments, the overlay plot 158 may include 2, 3, 4, 5, or more plots concurrently aligned and displayed. For example, FIG. 9 illustrates a screen view of a graphical alignment 158 of five plots that have been aligned respective various features of interest (e.g., features of interest 150, 151, 154, and 155).

In some embodiments, where the feature of interest includes a shape of a portion of the plots, the processors may calculate a correlation for one or more portions of other plots to determine whether the analyzed portion of each of the plots generally corresponds to the feature of interest in the currently selected plot being diagnosed. For example, the processors may determine a regression for any portion of the plots (e.g., points on one or more sides of a peak value). In some embodiments, the plots may be compared using least squares, ordinary least squares, linear least squares, part least squares, Bayesian estimations, or other estimations. Using the estimations, the plots may be compared to determine a coefficient of correlation or a goodness of fit between the plots. in some embodiments, the coefficient of correlation may include a Pearson product-moment correlation coefficient (PCC), an intraclass correlation coefficient, a rank correlation coefficient, or other suitable correlation coefficient.

Figure 10:
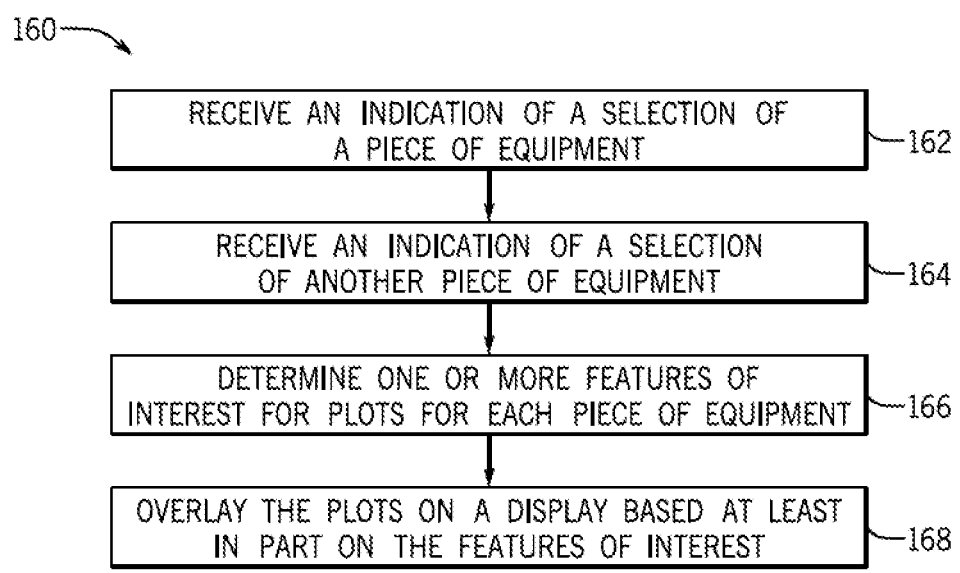
FIG. 10 is a flowchart illustrating an embodiment of a process for automatically overlaying data.

FIG. 10 is a process 160 that may be used for automatically overlaying data in a display of two or more plots to enable an operator to quickly identify similarities between the plots. The process 160 includes receiving, via an input device (e.g., I/O ports 32), an indication of a selection of a piece of equipment (e.g., a motor) and a time range over which diagnostic data is to be evaluated (block 162). The process 160 also includes receiving, via an I/O ports 32 (e.g., via keyboard, mouse, etc.), an indication of a selection of at least one other piece of equipment that is desired to compare diagnostic data with the piece of equipment (block 164). The processors then determine one or more features of interest in plots corresponding to both pieces of equipment (block 166). The processors then cause the features of interest to be overlaid on a display that is displaying the plots (block 168).

Although the process 160 relates to comparing different pieces of equipment, plots of a single piece of equipment may be compared. For example, the single piece of equipment may have multiple sensors which produce data to be compared. Also, even a data from a single sensor may be compared to data from the same sensor that is derived at a different time. Moreover, in some embodiments, the process 160 may be implemented using the processor 26.

Although the foregoing discussion discusses identifying similar data based on two dimensions (e.g., time and temperature), some embodiments may apply multiple dimensions. For example, the GUI 20 may present a matching trend based on additional dimensions, such as vibration, while the other dimensions are presented. In other words, the condition monitoring system may determine which plots are to be presented based on multiple trends. For example, if the temperature exceeds a threshold for a period of time and the vibration exceeds another threshold, a first set of plots may be presented or compared to the plot undergoing diagnosis. However, if the temperature exceeds the threshold but the vibration does not exceed the other threshold, a second set of plots may be presented or compared to the plot undergoing diagnosis. If the vibration exceeds the other threshold while the temperature does not exceed the first threshold, a third set of plots may be presented or compared to the plot undergoing diagnosis. In other words, each feature of interest may be thought of as a symptom that may indicate a different "condition" for the monitored device. By examining a list of symptoms, a most likely condition may be identified for the graphical plot and a corresponding graphical plot may be overlaid for quick verification of correlation. Although the foregoing discussion relates to values exceeding a threshold, symptoms may be indicated by any feature of interest in a graphical plot (e.g., sharp increase or slope in sensed vibration). Furthermore, additional types of measurement may be indicated in the graphical plots, such as pressure data, clearance data, position data, or other suitable measurement types that may be employed for monitoring a condition of the monitored device.

By automatically overlaying the similar data trends without operator input, the GUI 20 may present a concise data presentation that enables quick understanding and identification of an issue based on previous data. Furthermore, the automatic overlay allows the operator to diagnose the condition of a monitored device with simple visual correlation without manually comparing each plot and having to align (or scale) the plots. Accordingly, the operator may quickly analyze a faulty condition of monitored device and initiate maintenance for the monitored device quickly. Also, if the condition is determined to be correlated to a non-urgent matter, a maintenance event may be scheduled for the next period of inactivity for the monitored device.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:
1. A system, comprising:
a processor configured to:
receive an indication of a selection of a first piece of equipment in an industrial monitoring system;
determine a first feature of interest in a first plot corresponding to a first sensor configured to measure a first piece of equipment;
match the first feature of interest with a corresponding second feature of interest in a second plot by at least, calculating coefficients of correlation for a plurality of plots that includes the second plot; and
selecting the second plot from the plurality of plots based at least in part on the coefficients of correlation, wherein the coefficients indicate degrees of correlation between the first plot and corresponding plots of the plurality of plots,
wherein the second plot corresponds to a second sensor configured to measure a second piece of equipment;
determine the first feature of interest and the second feature of interest are misaligned in time;
align the first feature of interest with the second feature of interest by shifting at least one of the first plot and the second plot;
overlay the first plot with the second plot based at least in part on the first feature of interest aligned with the corresponding second feature of interest; and
output the overlay of the first plot and the second plot for display via a graphical user interface (GUI) to enable appropriate maintenance initiation for faulty conditions.

2. The system of claim 1, wherein the first feature of interest corresponds to a first problem with the first piece of equipment monitored by the first sensor.

3. The system of claim 2, wherein the overlay presents a graphical representation configured to enable correlation between the first plot and the second plot.

4. The system of claim 3, wherein the correlation enables identification of the first problem indicated in the first plot as similar to a corresponding problem recorded in the second plot.

5. The system of claim 1, wherein the first sensor is configured to measure vibration, temperature, clearance, position, or a combination thereof.

6. The system of claim 1, wherein the features of interest of the first and second plots comprise a sharp slope change in the corresponding plot, a peak value in the corresponding plot, a minimum value in the corresponding plot, a slope, a best fit curve, or any combination thereof.

7. The system of claim 1, wherein the first and second plots are recorded at the same time.

8. The system of claim 1, wherein the coefficients of correlation comprise Pearson product-moment correlation coefficients, intraclass correlation coefficients, rank correlation coefficients, or any combination thereof.

9. The system of claim 1, wherein the processor is configured to calculate the coefficients of correlation based at least in part on least squares, ordinary least squares, linear least squares, part least squares, Bayesian estimations, or any combination thereof.

10. A method, comprising:
determining a first feature of interest in a first plot of data undergoing diagnosis, wherein the first plot is obtained from a first sensor of one or more sensors configured to measure a first piece of equipment in an industrial monitoring system;
automatically matching, via a processor, the first feature of interest with a corresponding second feature of interest in a second plot by at least,
calculating coefficients of correlation for a plurality of plots that includes the second plot; and
selecting the second plot from the plurality of plots based at least in part on the coefficients of correlation, wherein the coefficients of correlation indicate degrees of correlation between the first plot and corresponding plots of the plurality of plots,
wherein the second plot is obtained from a second sensor configured to measure a second piece of equipment in the industrial monitoring system;
determining the first feature of interest and the second feature of interest are misaligned in time;
automatically aligning the first feature of interest with the second feature of interest by shifting at least one of the first plot and the second plot in response to the first feature of interest and the second feature of interest being misaligned in time;
automatically overlaying, via the processor, the first plot with the second plot based at least in part on the first feature of interest aligned with the corresponding second feature of interest; and
outputting the overlay of the first plot and the second plot for display via a graphical user interface (GUI).

11. The method of claim 10, wherein the first and second features of interest correspond to a problem with at least one piece of equipment monitored by at least one of the one or more sensors.

12. The method of claim 11, wherein the overlaying comprises presenting a graphical representation configured to enable correlation between the first plot and the second plot to identify events in the first plot which are similar to corresponding events recorded in the second plot.

13. The method of claim 10, wherein the first plot and the second plot correspond to temperature measurements, vibration measurements, clearance measurements, position measurements, speed measurements, pressure measurements, or a combination thereof.

14. The method of claim 10, wherein the first and second plots are recorded at the same time.

15. The method of claim 10, wherein the coefficients of correlation comprise Pearson product-moment correlation coefficients, intraclass correlation coefficients, rank correlation coefficients, or any combination thereof.

16. The method of claim 10, further comprising calculating the coefficients of correlation based at least in part on least squares, ordinary least squares, linear least squares, part least squares, Bayesian estimations, or any combination thereof.

17. A non-transitory, computer-readable medium having stored thereon instructions that, when executed, are configured to cause a processor to:
determine a first feature of interest in a first plot of data undergoing diagnosis, wherein the first plot is obtained from one or more first sensors configured to measure a first piece of equipment in an industrial monitoring system;
automatically match the first feature of interest with a corresponding second feature of interest in a second plot by at least,
calculating coefficients of correlation for a plurality of plots that includes the second plot; and
selecting the second plot from the plurality of plots based at least in part on the coefficients of correlation, wherein the coefficients of correlation indicate degrees of correlation between the first plot and corresponding plots of the plurality of plot,
wherein the second plot is obtained from a second sensor configured to measure a second piece of equipment in an industrial monitoring system;
determine the first feature of interest and the second feature of interest are misaligned in time;
align the first feature of interest with the second feature of interest by shifting at least one of the first plot and the second plot;
overlay the first plot with the second plot based at least in part on the first feature of interest and the corresponding second feature of interest; and
output the overlay of the first plot and the second plot for display via the graphical user interface (GUI).

18. The non-transitory, computer-readable medium of claim 17, wherein the instructions are configured to cause the processor to cause a display to display the overlaid first and second plots.

19. The non-transitory, computer-readable medium of claim 17, wherein the instructions are configured to cause the processor to overlay the first and second plots to enable correlation of similar events in the first and second plots on a display configured to enable monitoring of at least one a piece of equipment in the industrial monitoring system.

20. The non-transitory, computer-readable medium of claim 19, wherein the events corresponds to a problem with the at least one piece of equipment.

21. The non-transitory, computer-readable medium of claim 17, wherein the plots correspond to temperature measurements, vibration measurements, clearance measurements, position measurements, speed measurements, pressure measurements, or a combination thereof.

22. The non-transitory, computer-readable medium of claim 17, wherein the coefficients of correlation comprise Pearson product-moment correlation coefficients, intraclass correlation coefficients, rank correlation coefficients, or any combination thereof.

23. The non-transitory, computer-readable medium of claim 17, further comprising instructions that, when executed, are configured to cause a processor to calculate the coefficients of correlation based at least in part on least squares, ordinary least squares, linear least squares, part least squares, Bayesian estimations, or any combination thereof.

* * * * *